Jan. 27, 1942.   M. W. DITTO ET AL   2,270,870
METHOD OF HEAT-TREATING MATERIALS IN PROCESSES SUCH AS PRODUCTION
OF PORTLAND CEMENT OR REDUCTION OF ORES
Filed July 2, 1940    2 Sheets-Sheet 2
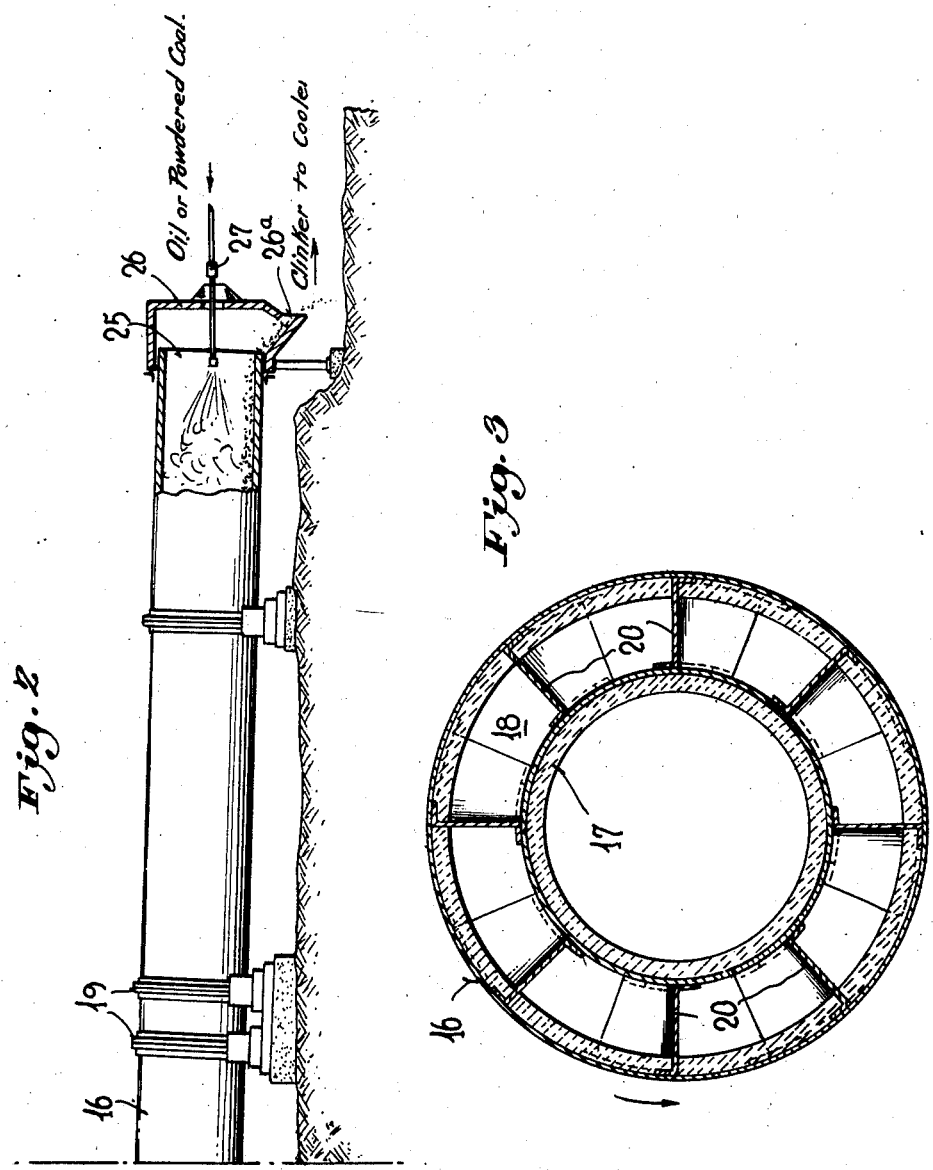
Inventors
M. W. Ditto,
R. F. Leftwich,
By Seymour, Bright & Nottingham
Attorneys Patented Jan. 27, 1942

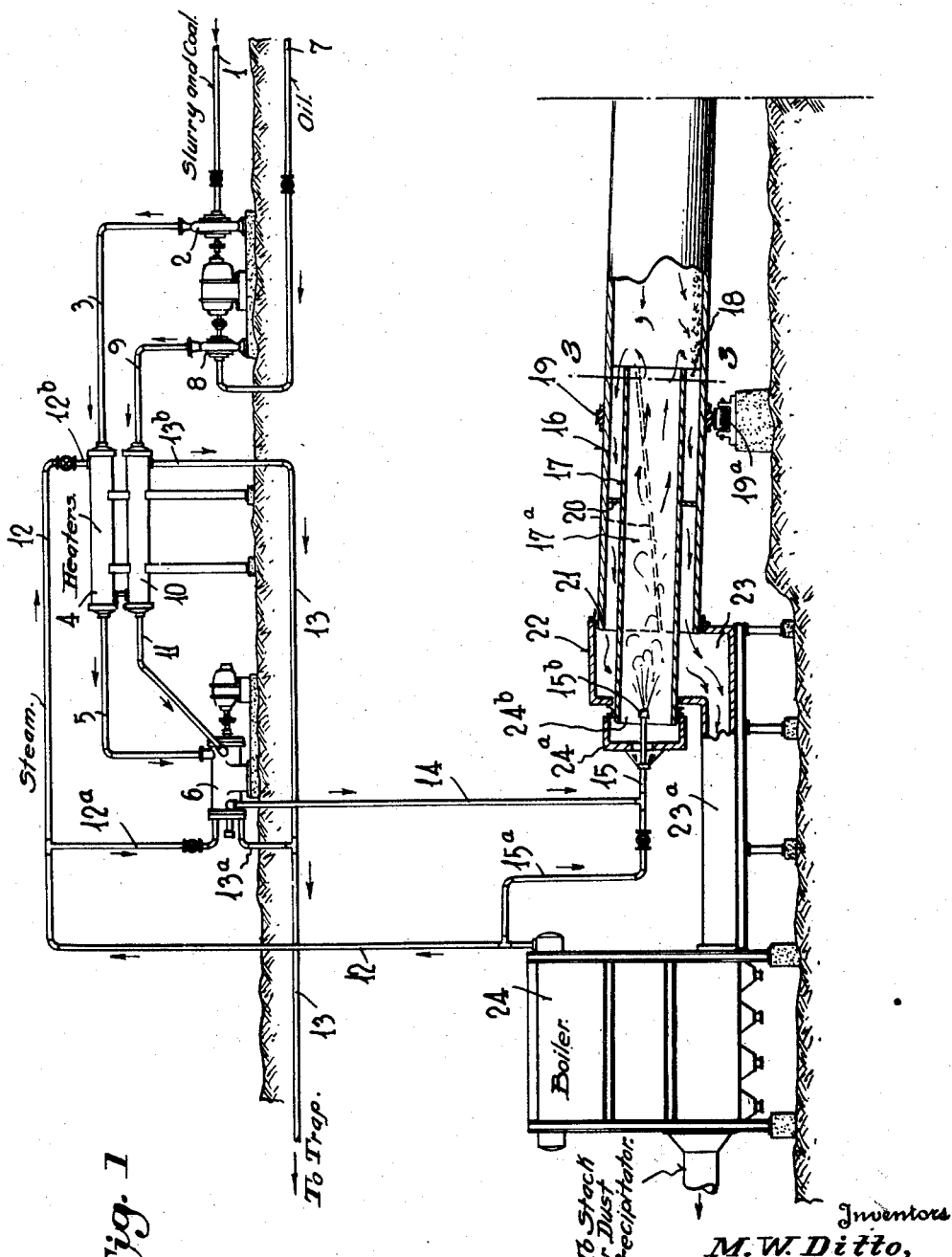

2,270,870

UNITED STATES PATENT OFFICE 2,270,870

METHOD OF HEAT-TREATING MATERIALS IN PROCESSES SUCH AS PRODUCTION OF PORTLAND CEMENT OR REDUCTION OF ORES

Marvin W. Ditto and Robert F. Leftwich, New York, N. Y., assignors to Emulsions Process Corporation, New York, N. Y., a corporation of Delaware Application July 2, 1940, Serial No. 343,670

6 Claims. (Cl. 263—53)

This invention relates to the manufacture of Portland cement and has for its object the production of an improved Portland cement possessing qualities of so-called high early strength cements.

In accordance with our invention the calcining zone of a cement-producing system is separated from the fusion zone so that the atmosphere in the kiln can be more accurately controlled and the usual heat losses can be reduced.

In order to better understand our process and its advantages we will point out some of the weaknesses and disadvantages of present methods of Portland cement manufacture. In the manufacture of cement clinker in the rotary kiln as practiced at present by the wet process, properly proportioned ingredients consisting of calcareous and argillaceous materials in the form of a slurry are introduced into the charge end of the rotary kiln. On entering, the mixture passes through the heating zone in which the moisture (which usually amounts to 35%) is evaporated, thence through the calcining zone where the $CO_2$ is dissociated from the calcium carbonate ($CaCO_3$) and magnesium carbonate ($MgCO_3$) leaving calcium oxide (CaO) and magnesium oxide (MgO) or lime which combines in the fusion zone with the silicates forming a cement clinker, the principal components of which are generally tricalcium aluminate ($3CaO.Al_2O_3$), tricalcium silicate ($3CaO.SiO_2$) and beta dicalcium silicate ($2CaO.SiO_2$) and such minor components as magnesium oxide (MgO) tricalcium ferrite ($3CaOFe_2O_3$) and smaller quantities of carbon dioxide, alkalies and silica.

There are two important series of chemical reactions to be effected in the kiln:

(1) The decomposition of the carbonates of lime and magnesia into oxides of these two metals.

(2) The combination of these oxides or lime with silica and alumina to form the three essential compounds of Portland cement—tricalcium silicate, tricalcium aluminate and dicalcium silicate.

The first series of reactions is endothermic requiring approximately 915 B. t. u. per pound of clinkers produced. The second series of reactions, the forming of silicates, is exothermic and requires only enough heat to raise the temperature of materials entering the fusion zone to approximately 2450° F. and maintain this temperature until the lime combines with the silicates and aluminates. During this time the formation of clinker releases approximately 200 B. t. u. per pound of clinker.

In present practice the most serious difficulty is the inability to thoroughly dissociate the carbon dioxide ($CO_2$) from the carbonates in the calcining zone before fusion and combination of lime and silicates takes place. This difficulty results from the inability to supply in the relatively short calcining zone the heat necessary for dissociating the carbon dioxide.

A certain amount of dry combination takes place far into the calcining zone and tests have shown that dissociation of carbon dioxide frequently takes place all the way through the fusion zone. This simultaneous calcining and fusing is largely responsible for any undesirable free lime in the clinker as produced in the manufacture of Portland cement. As the partially calcined material fuses, clinker balls of varying size are formed and as they pass into the fusion zone, evolution of carbon dioxide in the interior of the ball is constantly taking place and due to the endothermic reaction of the dissociation of carbon dioxide, the interior of the clinker ball is cooled below the temperature necessary for combination of lime and silicates. Thus the presence of free lime occurs in these clinker balls. The high lime ratio is not necessarily responsible for the presence of free lime. Low lime ratio produces fusion at a lower temperature which will result in production of larger clinker balls thus increasing the liability of free lime. Endothermic reaction by dissociation within a larger mass of clinker will sufficiently cool the interior of the clinker ball below the temperature necessary for combination.

There have been a number of proposals of processes of producing a higher early strength Portland cement. This is accomplished by producing a high lime cement and burning in two operations in order to eliminate the danger of the presence of free lime. In one instance, slurry for the manufacture of this clinker is prepared with a deficiency of lime producing carbonates. The clinker is formed, ground and sufficient additional lime added to satisfy the requirements of the silicates, then burned a second time to produce the desired clinker. In another case sufficient lime is added at the beginning of the first burning. The clinker is ground and burned a second time without the addition of lime. In both instances the disadvantages of the manufacture of Portland cement clinker in the rotary kiln are overcome by double burning of the material. Then in other instances production in the kiln is reduced in order to obtain slower and more thorough burning in the hope of making high lime cement with no free lime in one burning.

There are other variations from the practice of manufacturing standard Portland cement such as finer grinding of the raw material but these are to assist the kiln operator to dissociate all the carbon dioxide before fusion and combination start.

In wet process plants the variation in moisture content of the slurry seriously affects kiln operation. The most serious difficulty is the formation of mud rings which influence the flow of material through the kiln resulting in fluctuations in rate of feed of material into the calcining zone and from there into the fusion zone thus throwing the kiln operation out of balance. Usually chains are fitted into the kiln in order to prevent such an occurrence, however, with an excess of moisture mud rings may result on account of the raw material passing beyond the chains before being properly dried. Where the moisture content is too low the chains may become overheated and destroyed.

In addition to the difficulties encountered by the formation of mud rings in the upper end of the kiln in the wet process, clinker rings are formed. A clinker ring has a more serious effect than simply cutting down the diameter of the kiln; it also makes it impossible to get sufficient heat in the calcining zone to dissociate the carbon dioxide without overheating the fusion zone. This condition is one which does not improve but on the contrary consistently becomes more serious because it permits calcined material through its endothermic reaction to freeze on the clinker ring which is naturally at a high temperature. When the clinker ring becomes of appreciable size it acts as a baffle radiating the heat of the flame back into the fusion zone and thus prevents this heat from entering the calcining zone where it is most needed.

Difficulties are frequently encountered due to the coarseness of powdered fuel, particles of powdered coal fall on the clinker in the fusion zone and produce a reducing action in that zone resulting in the formation of a clinker which makes grinding difficult. By properly controlling the sizing of powdered fuel and proportion of primary air, conditions such as these can be prevented. Other disadvantages in the prior method of introducing fuel into the rotary kiln are the variations in draft which change the position of the heat zone in the kiln.

It is a primary purpose of our invention to overcome these disadvantages and produce an improved Portland cement containing no free lime, at a reduced cost and in a single burning operation. We accomplish this by calcining the carbonates before combination or fusion begins and by controlling the heat losses usually encountered.

Another and important object of the invention is the production of a superior Portland cement by utilizing kilns now used in prior processes.

With the foregoing objects outlined and with other objects in view which will appear as the description proceeds, the invention consists in the novel features of process steps, hereinafter described in connection with the accompanying drawings, in which:

Fig. 1 is a side elevation of the apparatus employed in proportioning, heating and emulsifying the slurry and fuel, and the feeding end portion of the kiln; the latter being shown partly in longitudinal vertical section.

Fig. 2 is a similar view of the remaining or discharge end portion of the kiln.

Fig. 3 is an enlarged transverse vertical sectional view of the kiln taken on line 3—3 of Fig. 1.

Referring to the drawings, 1 designates a pipe for conducting slurry, or slurry and powdered coal, to a pump 2 which forces the same through pipe 3, heater 4 and pipe 5 to the inlet end of a dispersion mill 6, preferably of the type disclosed in the M. W. Ditto Patent No. 2,169,339.

7 designates a pipe for conveying fuel oil to a pump 8 which forces it through pipe 9, heater 10 and pipe 11 to the inlet end of the dispersion mill. It will be noted that the pump 2 is larger than the pump 8 so that the amount of oil forced into the dispersion mill will be less than the amount of slurry and powdered coal.

12 indicates a pipe, which conducts steam to branch pipes 12a and 12b, supplying steam to the jackets of the dispersion mill and heaters respectively, and 13a and 13b are branch pipes leading respectively from the dispersion mill and the heaters to a pipe 13, which conducts exhaust steam or condensate to a suitable trap (not shown).

The dispersion mill is of the type to impart violent impact, turbulence and shear to materials passing therethrough, and as the result of the treatment in the mill, the slurry, or slurry and powdered coal, will have the fuel oil finely dispersed therein. The resulting emulsion may be passed from the mill through a pipe 14 to an atomizing burner 15 supplied with steam from pipe 12 by a branch 15a. The nozzle 15b of the burner is positioned centrally at one end of the main tube or drum 16 of the kiln and is arranged within an inner combustion tube 17 having a refractory lining surrounding an elongated combustion zone 17a. It will be noted that the tube 17 is of less external diameter than the internal diameter of the refractory-lined main tube 16, so as to provide an annular passageway 18 for the discharge of gases and vapors.

The main tube is rotated by any suitable means (not shown), and is provided with conventional external circular tracks 19 supported by rollers 19a.

Helical vanes 20 of substantially the same length as the portion of the inner tube which is arranged within the main tube 16, extend along the annular passageway 18, and connect the inner and outer tubes, as illustrated in Fig. 3.

The inlet end 21 of the main tube turns in a sealed joint arranged at one end of a stationary box 22 forming the inlet chamber 23 of a flue 23a serving to conduct hot gases and vapors from the main tube to a conventional waste heat boiler 24 which may be employed to produce the steam introduced into the pipe 12.

A stationary casing 24a is arranged at the inlet end 24b of the inner tube, and of course, that tube rotates relative to such casing.

As is customary the main tube of the kiln slopes downwardly towards its discharge end 25, and the latter rotates in a stationary casing 26 having a clinker discharge chute 26a. Any suitable fuel, such as oil or powdered coal, is sprayed into the outlet end of the main tube by a burner 27, and is, of course, burned in the kiln.

In using the apparatus, the slurry composed of argillaceous and calcareous materials mixed with water is emulsified with powdered fuel and oil or oil alone, and the mixture or emulsion is sprayed into the combustion chamber 17a, and subjected to combustion. Enough fuel will be emulsified with the slurry in the dispersion mill 6 to supply the heat for vaporization of the water in the emulsion, to raise the temperature of the flame and combustion chamber to the temperature of dissociation of the carbonates (approximately 1650° F.). Thus, in combustion chamber 17a, which we may designate as stage No. 1, the fuel in the atomized emulsion burns, releasing heat to evaporate the moisture in the slurry, raise the temperature of the solids to approximately 1650° F., and furnish sufficient heat to dissociate the $CO_2$ from the carbonates. During the calcining period, the temperature will remain at approximately 1650° F. as the endothermic reaction of calcining will consume heat until this reaction is completed. Stage No. 1 is started and either wholly or partially completed within chamber 17a, but will take place while the solids are still in suspension in the flame of the burning fuel; the solids finally falling on to the revolving inner surface of either the tube 17 or the main tube 16. As there is only sufficient fuel in the emulsion to accomplish the purposes of stage No. 1, the temperatures of the exhaust gases from burning and reactions in chamber 17a and immediately beyond its discharge end, will not exceed 1650° F. The draft causing the gases to travel through the exhaust passageway 18, will pull the products of combustion (composed of steam from the moisture of the slurry and $CO_2$ dissociated from the carbonates, together with the usual gases resulting from combustion of coal or oil) from the combustion chamber 17a and immediately adjacent to its discharge end, along the outer surface of cylinder 17, thus affording an opportunity for heat transfer from these gases at higher temperature to the interior of chamber 17a to aid in the early stages of burning in the combustion chamber.

The physical characteristics of the emulsions sprayed into the combustion chamber will be controlled to limit the quantity of solid material which might impinge upon the inner surface of the chamber, and cause instead as large a degree of evaporation and dissociation of carbon to take place in suspension as is practicable. It is natural to expect that a small percentage of solid particles will be deposited on the surface of the kiln before calcining has been completed, but due to the fact that we can accurately control the temperature and maintain it below that required for combination or fusion, no fusion or clinkering will take place in stage No. 1 of the process. Also mud rings will not form, as the preheating of chamber 17a from exhaust gases travelling through 18 will assure complete evaporation of the water from what small percentage of solids might drop from the flame before being completely dried.

In stage No. 2, of the process, which takes place in the main tube 16 at a satisfactory distance from the discharge end of tube 17, calcined solid material composed of lime (CaO and MgO) and silicates and aluminates, is raised in temperature to approximately 2450° F., at which combination and fusion takes place. The additional heat for this stage of the process will be furnished in the form of powdered fuel or oil introduced through atomizing burner 21, which causes the fuel to be burned in the lower or discharge end of the kiln, and the products of combustion to travel in the kiln counter-current to the flow of solids toward the outlet 26a. As the reactions taking place in the fusion zone or stage No. 2, are exothermic, the fuel required for burning in this zone may be sufficient only to raise the temperature of the solid material to 2450° F., and to compensate for the difference between the heat lost by radiation and the heat generated during the formation of the clinker. The heat of generation of the clinker is approximately 200 B. t. u. per pound of cement produced. The products of combustion from stage No. 2 are drawn through the kiln toward its upper end, thence through the annular flue 18 while they mix with the gases from stage No. 1, before the mixture is introduced into the flue 23a which conducts the same to the waste heat boiler. Gases from the latter may be discharged direct to a stack or to a dust precipitator, neither one of which is shown. The dust carried out by exhaust gases from our method will be a minimum, as we do not pass large quantities of the gases through the kiln proper before the clinker is formed. Of course, the finished clinker is discharged in the normal manner from the lower end of the kiln, and owing to the effectiveness of our method, it is unnecessary to recycle the same through our or any other cement producing process.

In order that the advantages of our process may be more clearly comprehended, we will illustrate by example the heat requirements in the two stages of burning, and how the fuel is proportioned between the stages.

The following example illustrates the operation of our process in the formation of clinker for the manufacture of Portland cement. The basis of this example is the processing of 900# of slurry consisting of 33⅓% water and 66⅔% solids to form clinker for producing one barrel of cement. The solid material of the slurry is assumed to analyse as follows:

| | Per cent |
|---|---|
| Silica | 14.0 |
| Alumina and ferric oxide | 6.7 |
| Calcium carbonate | 74.8 |
| Magnesium carbonate | 1.2 |
| Combined water | 0.6 |
| Miscellaneous | 2.7 |
| | 100.0 |

Composition of emulsion to be atomized through burner No. 15 into combustion chamber No. 17a:

| | Pounds per barrel cement |
|---|---|
| Solids | 600 |
| Water | 300 |
| Slurry | 900 |
| Coal (14,000 B. t. u./lb.) | 60 |
| Oil (18,000 B. t. u./lb.) | 20 |
| Emulsion | 980 |

STAGE #1.—*Heat input to kiln*

| | B. t. u. |
|---|---|
| Fuel in emulsion 60×14,000+ 20×18,000 | 1,200,000 |
| Sensible heat in emulsion (preheated to 350° F.): | |
| Water 300#×321 B. t. u. | 96,300 |
| Solids 600#×.22 (350° F.—70° F.) | 36,960 |
| Total heat | 1,333,260 |

Heat requirements

1. Heat for evaporation of water in slurry at 350° F.: Latent heat of evaporation of water at 350° F.=870 B. t. u.
   300# water × 870 B. t. u.=261,000 B. t. u.
2. Raising temperature of steam from 350° F. to 1650° F.: 300# × .54 (1650° F.−350° F.)= 210,600 B. t. u.
3. Raising temperature of solids from 350° F. to 1650° F.: 600# × .22 (1650° F.−350° F.)= 171,600 B. t. u.
4. Heat for decomposing $CaCO_3$ to $CaO$ and $CO_2$: .748 × 600# × 779 B. t. u.=350,000 B. t. u.
5. Heat for decomposing $MgCO_3$ to $MgO$ and $CO_2$: .012×600#×1282 B. t. u.=9,230 B. t. u.
6. Heat in products of combustion at 1650° F.:

|  | Pounds gas |
|---|---|
| Products from burning 60# coal with 10# air/#  | 660 |
| Products from burning 20# oil with 15# air/# | 320 |
| Total products comb. | 980 |

Air preheated to 350° F.: 980#×.25 (1650° F.−350° F.)=318,000 B. t. u.
Total heat requirements for stage #1, 1,320,430 B. t. u.

STAGE #2.—Heat input to kiln

|  | B. t. u. |
|---|---|
| Fuel atomized through burner No. 27: Coal 10#×14,000 B. t. u. | 140,000 |
| Heat generation: Formation of clinker 376#×200 B. t. u. | 75,200 |
| Total heat | 215,200 |

Heat requirements

1. Raising temperature of solids from 1650° F. to 2450° F.: 600# solids−200# $CO_2$ released=400# solids to fusion zone. 400#×.22 (2450° F.−1650° F.)=70,400 B. t. u.
2. Heat in products of combustion at 2450° F.: Products from burning 10# coal with 10# air/#=110# gas.
   110#×.25 (2450° F.−350° F.)=57,750 B. t. u.
3. Radiation loss: In present day practice where the radiation losses are approximately 10% of the total input of heat, this loss proves out to be a function of the surface area of the kiln and the mean surface temperature. The entire surface of the kiln is considered in standard practice as the reactions taking place in the kiln are directly adjacent to the inner lining of the kiln. In our practice, however, the first stage of the process is carried on within the chamber No. 17a which is not subjected to cooling but to the contrary is being heated by the exhaust gases. Our radiation losses will therefore be computed on that heat which might be dissipated through the shell in the kiln proper. It is reasonable to assume that losses by radiation between the discharge end of the combustion chamber No. 17a and the discharge end of the kiln No. 16 will be small compared to those losses from a kiln where the entire length is used for the reactions, we will use an arbitrary figure of 5%.

.05×1,548,460 B. t. u.=77,423 B. t. u.

Heat balance

|  | B. t. u. |
|---|---|
| Gross heat input to kiln | 1,473,260 |
| Heat generation during formation clinker | 75,200 |
| Total heat | 1,548,460 |

Heat losses

Stage No. 1:

|  | B. t. u. |
|---|---|
| 1. Heat of evaporation of water | 261,000 |
| 2. Raising temp. of steam to 1650° F. | 210,000 |
| 3. Raising temp. of solids to 1650° F. | 171,600 |
| 4. Heat for decomposing $CaCO_3$ | 350,000 |
| 5. Heat for decomposing $MgCO_3$ | 9,230 |
| 6. Heat in products of combustion at 1650° F. | 318,000 |

Stage No. 2:

|  | B. t. u. |
|---|---|
| 1. Raising temp. of solids to 2450° F. | 70,400 |
| 2. Heat in products of combustion at 2450° F. | 57,750 |
| 3. Radiation losses | 77,423 |
| Miscellaneous and unaccounted for | 23,057 |
| Total losses | 1,548,460 |

Products of combustion exhausted from kiln to waste-heat boiler

|  | Pounds gas |
|---|---|
| Products of combustion stage #1 | 980 |
| $CO_2$ released stage #1 | 200 |
| Steam from stage #1 | 300 |
| Products of combustion from stage #2 | 110 |
| Total products in exhaust gases | 1,590 |

Assuming the exhaust gas temp. to boiler at 1200° F.: Heat available for steam generation 1200° F.×1590#×.25=477,000 B. t. u.

In practicing our process we can definitely and positively dissociate all the carbon dioxide before combination or fusion begins by an arrangement which increases the area of the charge exposed to hot gases; this is doubly effective in increasing the rapidity and degree of $CO_2$ dissociation. By intimately emulsifying the powdered coal or fuel oil or whatever other forms of gaseous, liquid, or powdered fuel used, we provide each fine particle of raw material with a particle of fuel which as it burns produces an immediate flash drying as well as dissociation of $CO_2$ from the carbonates. Due to this intimate association of fuel and raw material, the efficiency with which this is accomplished is much higher than in standard practice where the rotary motion of the kiln is expected to expose the raw material to the hot gases which furnish the heat necessary for dissociation. As the formation of mud rings or clinker rings is eliminated by our procedure we can at all times during operation maintain uniform conditions of feeding and burning. Any desired quality of Portland cement can be accurately and uniformly produced by our process where high early strengths are desired and high lime percentages are necessary. Cement clinker can be produced without the danger of the presence of free lime and it will not be necessary to grind the clinker and return it in order to eliminate the free lime. The temperatures necessary for producing the clinker can be uniformly controlled and the heat losses thus minimized.

It is generally accepted fact that it is impossible to produce volume constant cement of high lime content by a single burning operation as practiced at the present time and that the presence of excess lime in the finished product is detrimental. We completely eliminate the danger of free lime in the finished product by complete calcination before clinkering takes place. Whereas, we indicate in our drawings a zone beyond the point where burning takes place in the atomized emulsion of fuel and slurry to assure complete calcination in case it has not been accomplished in the flame, we completely calcine the calcium carbonates in suspension and before they have been able to become intimately enough associated with the silicates to start combination.

We have indicated the emulsion as introduced through a single burner and also the straight fuel at the discharge end of the kiln as atomized from a single burner, we do not limit ourselves to this arrangement but may employ multiple burners at either location. Also the ratio of the length of the inner cylinder No. 17 to kiln No. 16 is arbitrary and may be varied to suit local conditions. We have selected this arrangement merely to furnish a simple flow sheet to illustrate our process.

Although we have described our process as emulsifying the complete mixture of calcareous and argillaceous materials, we do not limit ourselves to this type of emulsion but may establish our practice in some instances where the carbonates or other ingredients of the slurry may be separately emulsified and introduced into the charge end of the furnace through separate atomizers. We also do not limit ourselves to the use of rotary type of kiln and merely use this type to illustrate our process because it is the universally used furnace in the manufacture of Portland cement.

In addition to the use of our process in the manufacture of Portland cement we recognize its adaptability to those fields in which dissociation of gases prior to sintering or smelting of ores is necessary. As an illustration, in the production of copper we can follow this same practice in the elimination of $SO_2$ and sintering of the pyrites cinder prior to the reverberatory or Bessemer converter treatment.

In practice today the sulphur is eliminated in a large measure by roasting the concentrates in sintering machines. In our case we would make an emulsion of the fuel either pulverized coal or oil with the pulverized ore, spray it into the combustion chamber and as a result of the combustion of the fuel, raise the temperature of the finely divided ore material in the presence of excess oxygen and eliminate the sulphur in the form of $SO_2$ or hydrogen sulphide ($H_2S$). Other types of mineral ores would also submit to the same treatment such as iron pyrites, zinc blend (ZnS) in fact any ore that occurs in the form of oxides, carbonates or sulphides.

The process would work effectively on iron oxide ores in areas where coal was expensive but fuel oil plentiful and cheap. The ore could be reduced to sponge iron by this method and then melted into pigs for later treatment to manufacture steel.

It is believed the steps of the method may be clearly understood from the foregoing, and it will be apparent to those familiar with this subject that various changes can be made without departing from the spirit of the invention as defined by the following claims.

What we claim and desire to secure by Letters Patent is:

1. A method of the character described, comprising finely dispersing a flowable fuel in solid materials while the latter are in a slurry condition, introducing the mixture in atomized condition into a combustion zone and burning said fuel therein while said materials are mainly in suspension whereby sufficient heat is released to evaporate the moisture in the slurry and raise the temperature of the solids to a reaction temperature, passing the solids, gases and vapors from the combustion zone into an elongated passageway, separating the gases and vapors from the solids and discharging said gases and vapors from the passageway at a point adjacent to the combustion zone, passing the hot solids through said passageway in a direction away from said point, introducing hot gases of combustion into said passageway at a point remote from the first-mentioned point and contacting the same with the hot solids while said hot gases of combustion travel toward said first-mentioned point, and discharging converted solids from said passageway at a point adjacent to that where the hot gases of combustion are introduced into the passageway.

2. A process of producing Portland cement comprising mixing a flowable fuel, water and finely ground calcareous and argillaceous materials into a flowable slurry, introducing the slurry in atomized condition into a combustion zone and burning said fuel therein while said materials are mainly in suspension whereby sufficient heat is released to evaporate the moisture in the slurry, calcine the solids at approximately 1650° F. to dissociate the $CO_2$ from the carbonates, separating the gases and vapors from the solids and discharging the gases and vapors from the process, subsequently passing the solids through a passageway, and burning sufficient secondary fuel in said passageway to furnish enough heat to fuse the calcined solids into cement clinker.

3. A method of producing Portland cement comprising finely dispersing a flowable fuel in calcareous and argillaceous materials while the latter are in a slurry condition, introducing the mixture in atomized condition into a combustion zone and burning said fuel therein while said materials are mainly in suspension whereby sufficient heat is released to evaporate the moisture in the slurry, raise the temperature of the solids to approximately 1650° F. and dissociate the $CO_2$ from the carbonates, passing the solids, gases and vapors from the combustion zone into a passageway, separating the gases and vapors from the solids and discharging said gases and vapors from the passageway at the point adjacent to the combustion zone, passing the hot solids through said passageway in a direction away from said point, introducing hot gases of combustion into the passageway at a point remote from the first-mentioned point and contacting the same with the hot solids while said hot gases of combustion travel toward said first-mentioned point, and discharging cement clinker from the passageway.

4. A method of producing Portland cement comprising preheating and finely dispersing a flowable fuel in preheated calcareous and argillaceous materials while the latter are in a slurry condition, introducing the preheated mixture in atomized condition into a combustion zone and burning said fuel therein while said materials are mainly in suspension whereby sufficient heat is released to evaporate the moisture in the slurry, raise the temperature of the solids to approximately 1650° F. and dissociate the $CO_2$ from the carbonates, passing the solids, gases and vapors from the combustion zone into a passageway, separating the gases and vapors from the solids and discharging said gases and vapors from the passageway at a point adjacent to the combustion zone, passing the hot solids through said passageway in a direction away from said point, introducing hot gases of combustion into the passageway at a point remote from the first-mentioned point and contacting the same with the hot solids while said hot gases of combustion travel toward said first-mentioned point, and discharging cement clinker from the passageway.

5. A method of producing Portland cement, comprising finely dispersing a fuel oil in a slurry of calcareous and argillaceous materials, introducing the mixture in atomized condition into a combustion zone and burning said fuel therein while said materials are mainly in suspension whereby sufficient heat is released to evaporate the moisture in the slurry, raise the temperature of the solids to approximately 1650° F. and dissociate the $CO_2$ from the carbonates, passing the solids, gases and vapors from the combustion zone into a passageway, separating the gases and vapors from the solids and discharging said gases and vapors from the passageway at a point adjacent to the combustion zone, passing the hot solids through said passageway in a direction away from said point, introducing hot gases of combustion into the passageway at a point remote from the first-mentioned point and contacting the same with the hot solids while said hot gases of combustion travel toward said first-mentioned point, and discharging cement clinker from the passageway.

6. A method of producing Portland cement comprising finely dispersing a fuel oil in a slurry of calcareous and argillaceous materials and powdered carbonaceous fuel, introducing the mixture in atomized condition into a combustion zone and burning said fuels therein while said materials are mainly in suspension whereby sufficient heat is released to evaporate the moisture in the slurry, raise the temperature of the solids to approximately 1650° F. and dissociate the $CO_2$ from the carbonates, passing the solids, gases and vapors from the combustion zone into a passageway, separating the gases and vapors from the solids and discharging said gases and vapors from the passageway at a point adjacent to the combustion zone, passing the hot solids through said passageway in a direction away from said point, introducing hot gases of combustion into the passageway at a point remote from the first-mentioned point and contacting the same with the hot solids while said hot gases of combustion travel toward said first-mentioned point, and discharging cement clinker from the passageway.

MARVIN W. DITTO.
ROBERT F. LEFTWICH.